United States Patent
Wang et al.

(10) Patent No.: US 11,681,203 B2
(45) Date of Patent: Jun. 20, 2023

(54) OPTICAL SYSTEM

(71) Applicant: TDK TAIWAN CORP., Taoyuan (TW)

(72) Inventors: Chao-Hsi Wang, Taoyuan (TW); Chao-Chang Hu, Taoyuan (TW); Chih-Wei Weng, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/480,790

(22) Filed: Sep. 21, 2021

(65) Prior Publication Data

US 2022/0004083 A1    Jan. 6, 2022

Related U.S. Application Data

(63) Continuation of application No. 16/741,006, filed on Jan. 13, 2020, now Pat. No. 11,156,899.
(Continued)

(30) Foreign Application Priority Data

Dec. 20, 2019   (EP) .................................... 19218896

(51) Int. Cl.
| | | |
|---|---|---|
| *G03B 9/06* | (2021.01) | |
| *G02B 7/08* | (2021.01) | |
| *G02B 7/09* | (2021.01) | |
| *G02B 27/64* | (2006.01) | |
| *G03B 13/36* | (2021.01) | |
| *G03B 5/06* | (2021.01) | |

(Continued)

(52) U.S. Cl.
CPC ................. *G03B 9/06* (2013.01); *G02B 7/08* (2013.01); *G02B 7/09* (2013.01); *G02B 27/646* (2013.01); *G03B 5/06* (2013.01); *G03B 13/36* (2013.01); *G03B 30/00* (2021.01); *G03B 2205/0023* (2013.01); *G03B 2205/0069* (2013.01); *H04N 23/57* (2023.01); *H04N 23/687* (2023.01)

(58) Field of Classification Search
CPC ... G03B 9/06; G03B 9/14; G03B 5/00; G03B 2205/0069; G03B 3/10; G03B 30/00; G03B 2205/0053; H04N 5/2254; H04N 23/55
USPC ........................................................ 396/510
See application file for complete search history.

(56) References Cited

U.S. PATENT DOCUMENTS

| | | |
|---|---|---|
| 2013/0027524 A1 | 1/2013 | Park |
| 2013/0077950 A1 | 3/2013 | Liu |
| | (Continued) | |

*Primary Examiner* — Christopher E Mahoney
(74) *Attorney, Agent, or Firm* — Muncy, Geissler, Olds & Lowe, P.C.

(57) ABSTRACT

An optical system is provided. The optical system includes a movable portion used for connecting to an optical element having an optical axis, a fixed portion, and a second driving assembly used for driving the movable portion to move relative to the fixed portion. The movable portion includes a bottom having a window corresponding to the optical axis, a first blade corresponding to the window, and is movable relative to the bottom, a connecting element movable relative to the bottom and is used for bringing the first blade to move, and a first driving assembly used for driving the connecting element to move relative to the bottom. The movable portion is movable relative to the fixed portion. The fixed portion has a polygonal structure when viewed along the optical axis.

19 Claims, 21 Drawing Sheets

Related U.S. Application Data

(60) Provisional application No. 62/799,886, filed on Feb. 1, 2019.

(51) Int. Cl.
    *G03B 30/00*     (2021.01)
    *H04N 23/57*     (2023.01)
    *H04N 23/68*     (2023.01)

(56) References Cited

U.S. PATENT DOCUMENTS

| | | |
|---|---|---|
| 2018/0164538 A1 | 6/2018 | Lee |
| 2018/0343370 A1 | 11/2018 | Park |
| 2020/0007729 A1 | 1/2020 | Ha |
| 2020/0012170 A1 | 1/2020 | Hong |
| 2020/0077000 A1* | 3/2020 | Lee .................. H04N 5/2257 |
| 2020/0249545 A1 | 8/2020 | Wang |

* cited by examiner

501

502

OPTICAL SYSTEM

CROSS-REFERENCE TO RELATED APPLICATIONS

This application is a Continuation of application Ser. No. 16/741,006, filed on Jan. 13, 2021, which priority to U.S. Provisional Patent Application No. 62/799,886, filed on Feb. 1, 2019, and European Patent Application No. 19218896.9, filed on Dec. 20, 2019, which are incorporated by reference herein in their entirety.

BACKGROUND OF THE DISCLOSURE

Field of the Disclosure

The present disclosure relates to an optical system.

Description of the Related Art

As the relevant technologies have developed, many electronic devices (such as cameras or smart phones) can record images and videos. However, when a lens having a long focal length is provided in the electronic device, the thickness thereof may be increased to adversely impede the prospects for miniaturization of the electronic device. Furthermore, conventional micro image capturing modules are mainly designed to have an aperture with a fixed size, and the image sharpness and photosensitivity of most small mobile electronic devices are not adjustable. A smaller aperture is required to achieve better image quality if the sensor supports it and if there is enough light. However, if the aperture is fixed at a small size, image quality will be low when there is not enough light (e.g. at night). As a result, the image capturing ability under different environments will be sacrificed if the size of the aperture is fixed.

BRIEF SUMMARY OF THE DISCLOSURE

An optical system is provided in some embodiments. The optical system includes a movable portion used for connecting to an optical element having an optical axis, a fixed portion, and a second driving assembly used for driving the movable portion to move relative to the fixed portion. The movable portion includes a bottom having a window corresponding to the optical axis, a first blade corresponding to the window, and is movable relative to the bottom, a connecting element movable relative to the bottom and is used for bringing the first blade to move, and a first driving assembly used for driving the connecting element to move relative to the bottom. The movable portion is movable relative to the fixed portion. The fixed portion has a polygonal structure when viewed along the optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
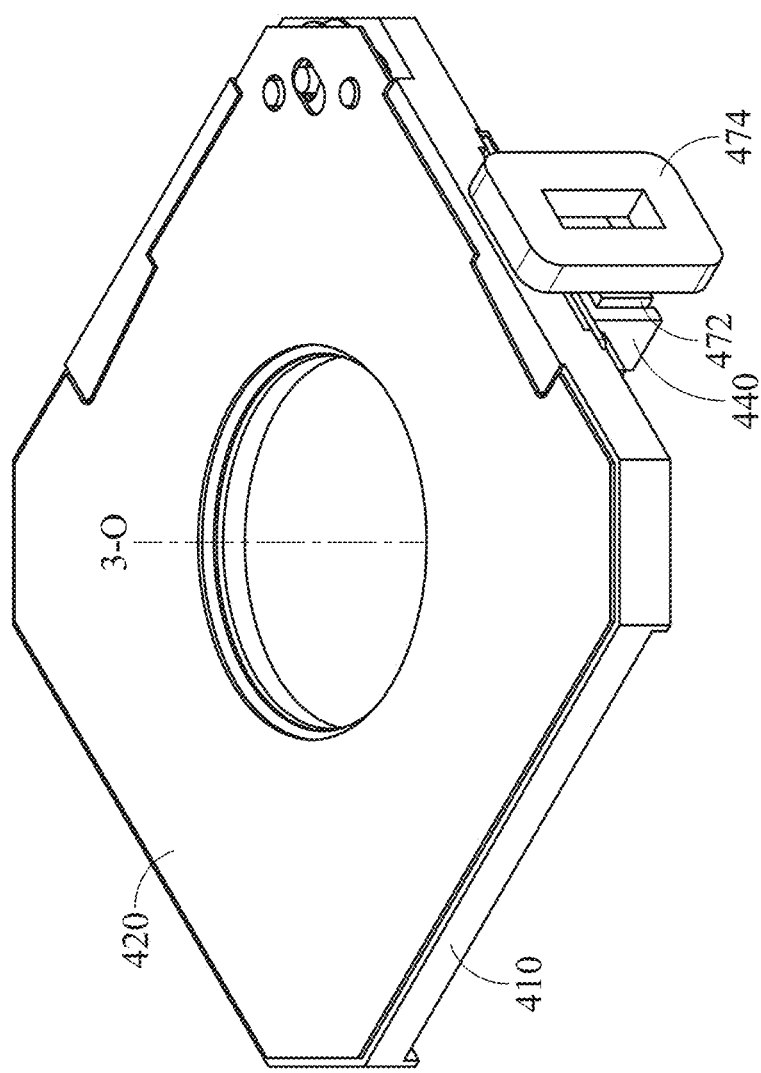
FIG. 1 is a perspective view of a light flux adjustment module in some embodiments of the present disclosure.
Figure 2:
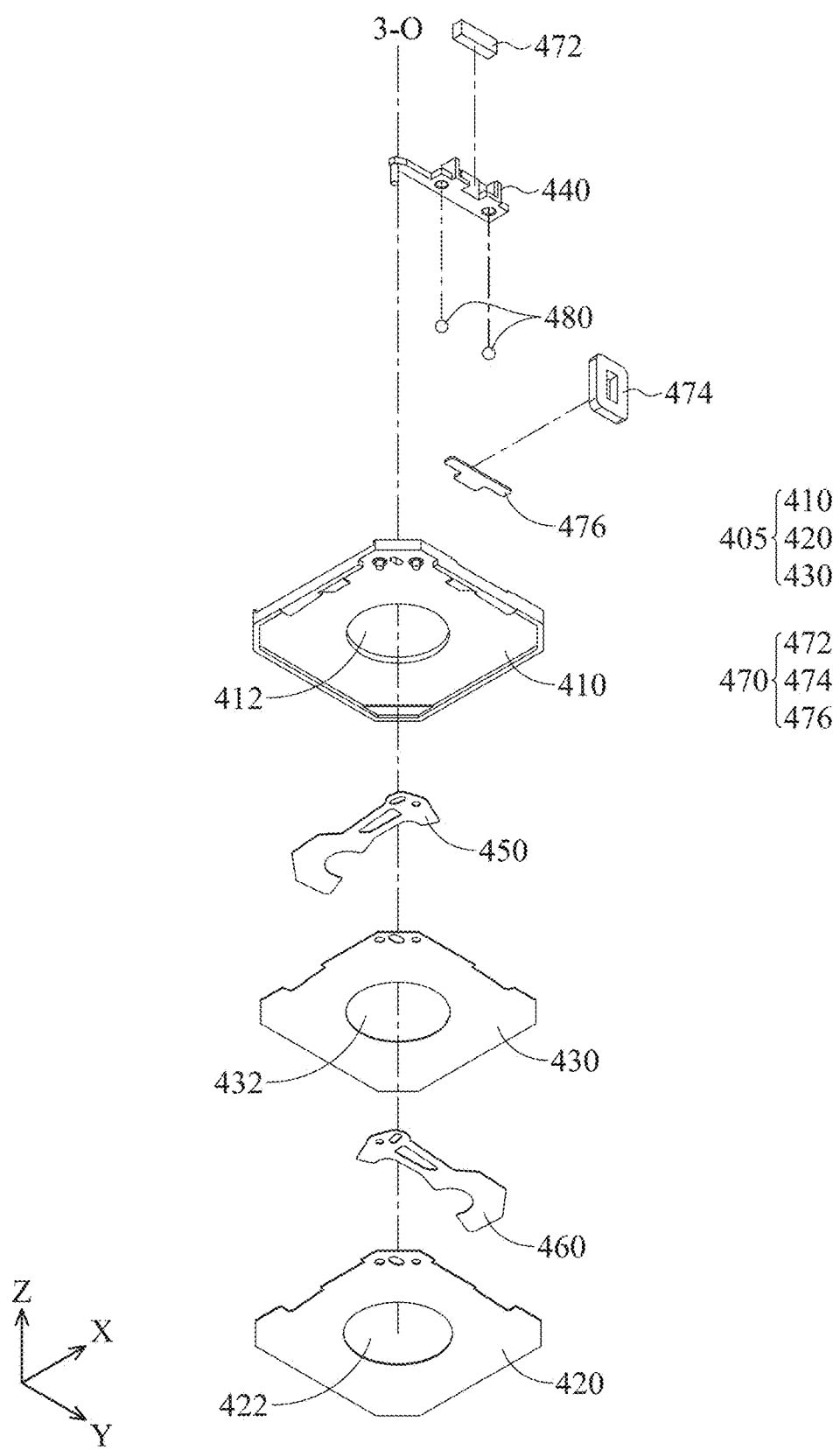
FIG. 2 is an exploded view of a light flux adjustment module in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Figure 3:
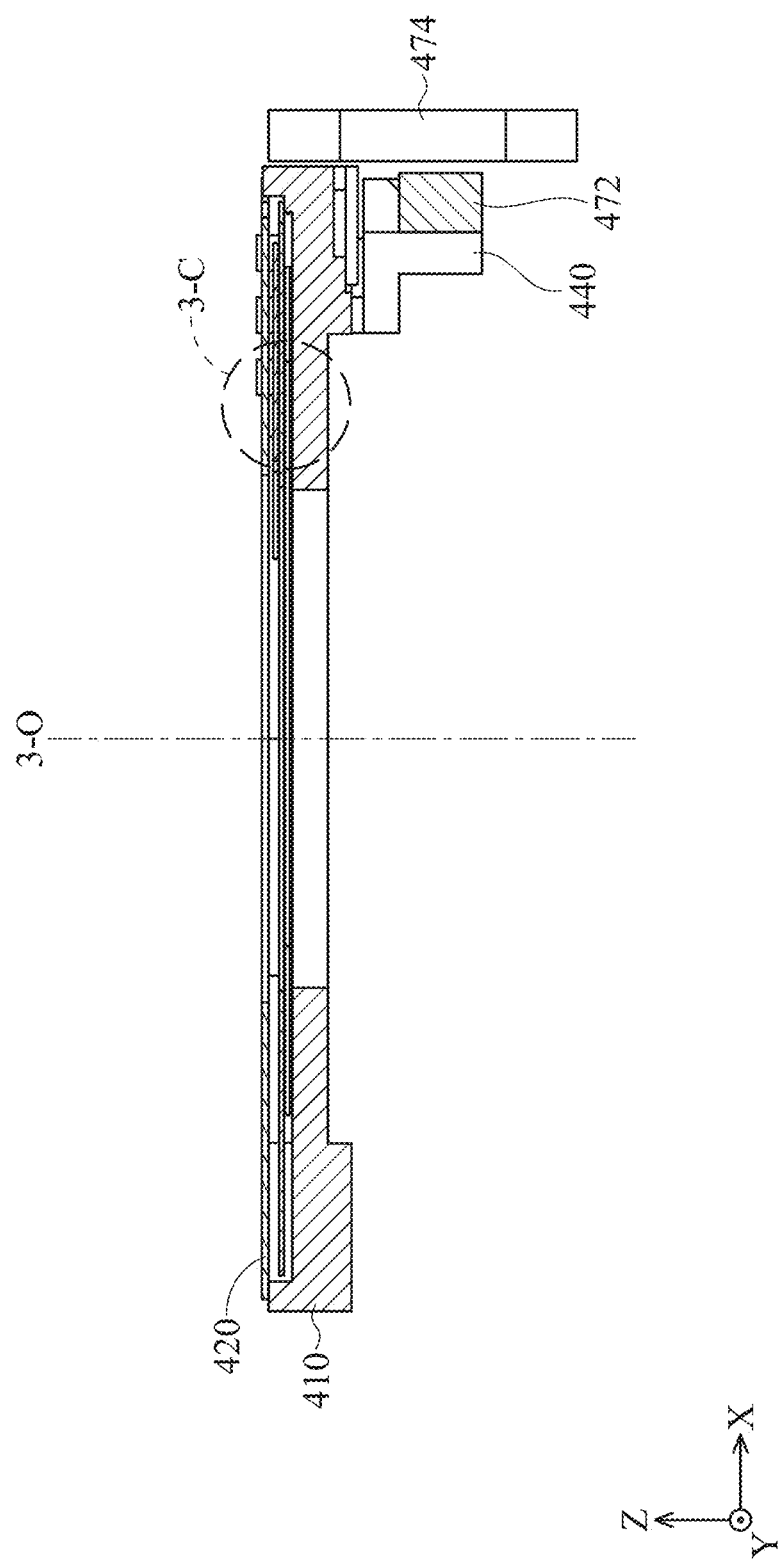
FIG. 3 is a cross-sectional view of a light flux adjustment module in some embodiments of the present disclosure.
Figure 4:
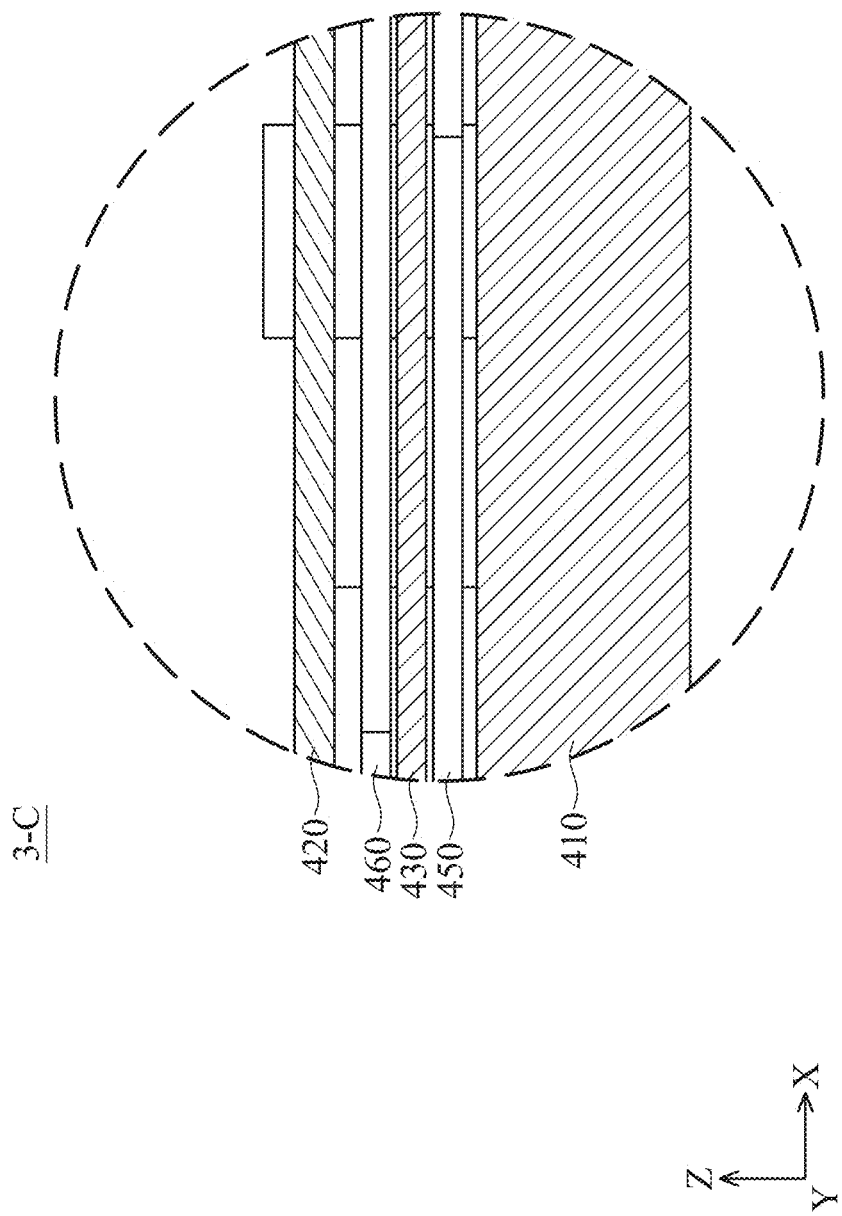
FIG. 4 is an enlarged view of the portion 3-C in FIG. 3.

Refer to FIGS. 1, 2, 3 and 4, which are a schematic view, an exploded view, a cross-sectional view of a light flux adjustment module 401 in some embodiments of the present disclosure, and an enlarged view of a portion 3-C in FIG. 3, respectively. The light flux adjustment module 401 may be disposed in an electronic device and used to take photographs or record video. The electronic device can be a smartphone or a digital camera, for example. When taking photographs or recording video, these optical modules can receive lights and form images, wherein the images can be transmitted to a processor (not shown) in the electronic device, where post-processing of the images can be performed.

The light flux adjustment module 401 mainly includes a case 410, a top plate 420, a middle plate 430, a connecting element 440, a first blade 450, a second blade 460, a drive assembly 470 (includes a driving magnetic element 472, a driving coil 474 and a positioning magnetic element 476) and balls 480. A space is formed between the case 410 and the top plate 420, and the first blade 450 and the second blade 460 are disposed in the space to prevent the first blade 450 and the second blade 460 from colliding with other elements when operating. Furthermore, the middle plate 430 is disposed between the first blade 450 and the second blade 460 to prevent the first blade 450 and the second blade 460 from colliding with each other when operating. In some embodiments, the case 410, the top plate 420, and the middle plate 430 may be called as a fixed portion 405, the connecting element 440 is movably connected to the fixed portion 405, and the first blade 450 and the second blade 460 are movably connected to the fixed portion 405 and the connecting element 440. The top plate 420 is disposed on a side of the first blade 450 which is far from the fixed portion 405.

The case 410, the top plate 420, and the middle plate 430 include through holes 412, 422, and 432, respectively. In some embodiments, the through holes 412, 422 and 432 forms a window, and a light having an optical axis 3-O passes through the window formed by the through holes 412, 422, and 432. In some embodiments, the through holes 412, 422, and 432 may have an identical size or shape, but the present disclosure is not limited thereto.

The connecting element 440 may be disposed at, for example, a side of the fixed portion 405, and the drive assembly 470 may be used for driving the connecting element 440 to move relative to the fixed portion 405 in a first moving dimension (e.g. Y direction). Furthermore, the first blade 450 and the second blade 460 may be disposed at the same side of the fixed portion 405, which is different than the side where the connecting element 440 is located.

The details of the elements of the light flux adjustment module 401 are described later. FIGS. 5 to 9 are schematic views of the case 410, the middle plate 430, the connecting element 440, the first blade 450, and the second blade 460, respectively.

Figure 5:
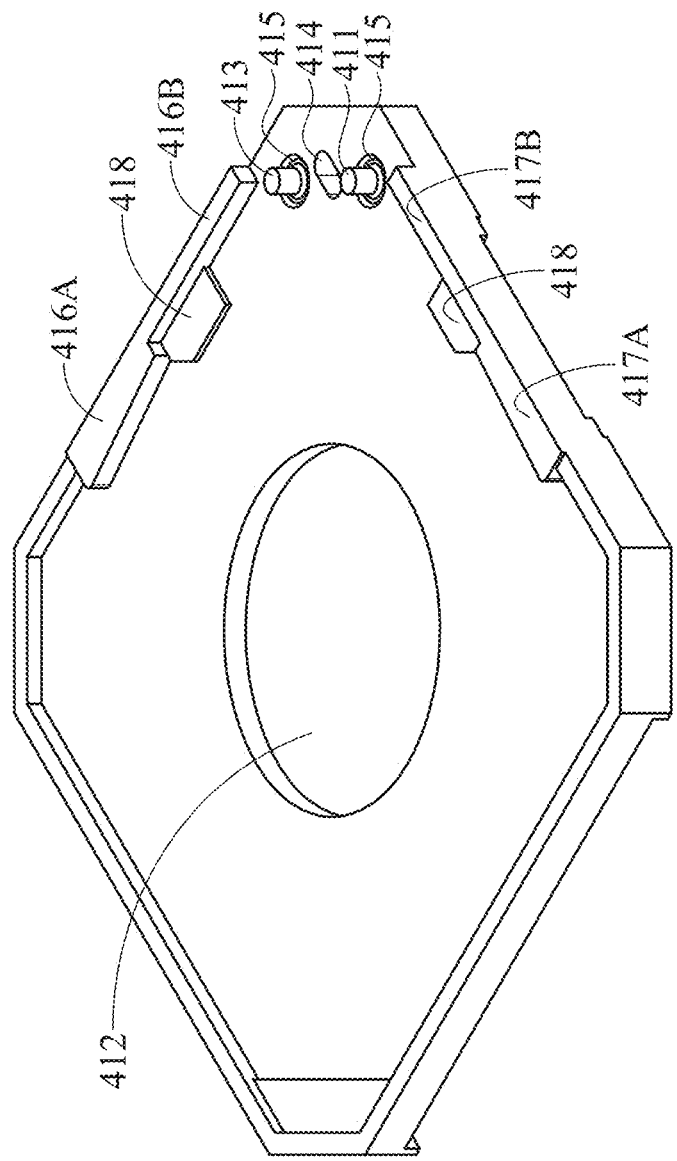
FIG. 5 is a schematic view of a case.

In FIG. 5, the case 410 has a substantially rectangular shape, and has a first column 411 (first pivot) and a second column 413 (second pivot) that are positioned at corners of the case 410 and extended in the Z direction. In other words, the first column 411 is parallel to the second column 413. Concave portions 415 are positioned adjacent to the first column 411 and the second column 413, which concave in a direction (i.e. −Z direction) that is opposite to the extending direction of the first column 411 and the second column 413, and the concave portions 415 surround the first column 411 and the second column 413. Furthermore, a recess 414 is positioned between the first column 411 and the second column 413. As shown in FIG. 5, the recess 414 may extend in the Y direction, but the present disclosure is not limited thereto. For example, in some embodiments, the recess 414 may extend in the X direction, depending on design requirement. Furthermore, dusts may be accommodated in the concave portions 415, and error created during manufacturing may be compensated to improve assemble accuracy due to the design of the concave portions 415 being positioned adjacent to the first column 411 and the second column 413.

A first limiting portion 416A and a fourth limiting portion 416B may be positioned at an edge of the case 410, and protrude from the edge to the through hole 412. A second limiting portion 417B and a third limiting portion 417A may be positioned at another edge of the case 410 and protrude into the through hole 412. The first limiting portion 416A is connected to the fourth limiting portion 416B, and the second limiting portion 417B is connected to the third limiting portion 417A. The distance between the first limiting portion 416A and the through hole 412 is less than the distance between the fourth limiting portion 416B and the through hole 412 in the X direction. The distance between the third limiting portion 417A and the through hole 412 is less than the distance between the second limiting portion 417B and the through hole 412 in the Y direction. Furthermore, the distance between the fourth limiting portion 416B and the first column 411 is less than the distance between the first limiting portion 416A and the first column 411, and the distance between the second limiting portion 417B and the second column 413 is less than the distance between the third limiting portion 417A and the second column 413. As a result, the size of the window of the light flux adjustment module 401 may be adjusted.

Moreover, protruding portions 418 may be positioned on the case 410 and protrude in the X direction, wherein the protruding portions 418 are adjacent to the first limiting portion 416A and the fourth limiting portion 416B, and adjacent to the second limiting portion 417B and the third limiting portion 417A. The height of the protruding portion 418 may be greater than the thickness of the first blade 450 in the Z direction. As a result, the middle plate 430 may be prevented from directly contacting the first blade 450 if the middle plate 430 is disposed on the case 410, so the durability of the first blade 450 may be enhanced.

Figure 6:
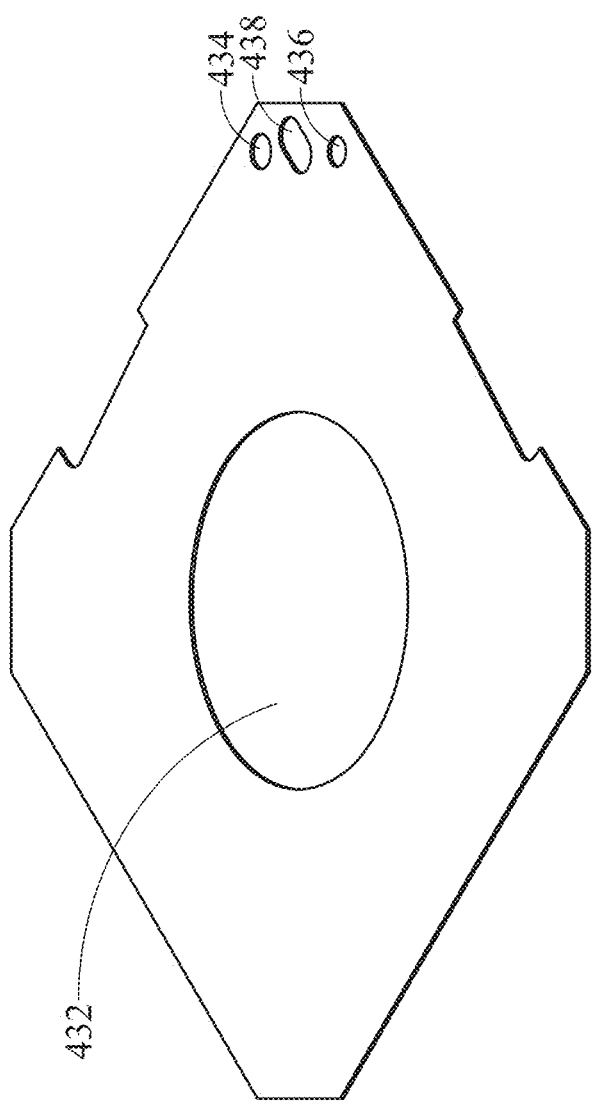
FIG. 6 is a schematic view of a middle plate.

In FIG. 6, the middle plate 430 includes holes 434 and 436, and a recess 438 positioned between the holes 434 and 436. The middle plate 430 may have a shape corresponding to the case 410. For example, the positions of the holes 434 and 436 may correspond to the second column 413 and the first column 411 to allow the second column 413 and the first column 411 passing through the holes 434 and 436, so the middle plate 430 may be affixed to the case 410. Moreover, the recess 438 may extend in X or Y directions. The top plate 420 has a similar shape of the middle plate 430, and is not repeated.

Figure 7:
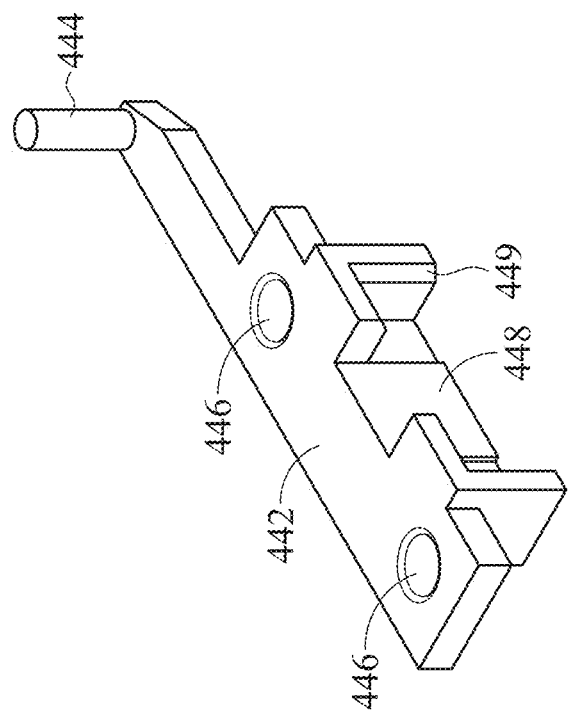
FIG. 7 is a schematic view of a connecting element.

In FIG. 7, the connecting element 440 includes a main body 442, a driving portion 444 extended from the main body 442, and concaves 446 concave in a direction that is opposite to the extending direction of the driving portion 444. The concaves 446 may be circular to allow the balls 480 (FIG. 2) being accommodated in the concaves 446, so the connecting element 440 may move smoothly relative to the fixed portion 405 via the rotation of the balls 480. The driving portion 444 may be disposed in the recesses 414 and 438 to allow the driving portion 444 move along the extension direction of the recesses 414 and 438. Furthermore, a concave portion 448 is positioned at a side of the main body 442, and the driving magnetic element 472 may be disposed in the concave portion 448. A tilting portion 449 is positioned at sides of the concave portion 448, so the driving magnetic element 472 may be easily disposed in the concave portion 448.

Figure 8:
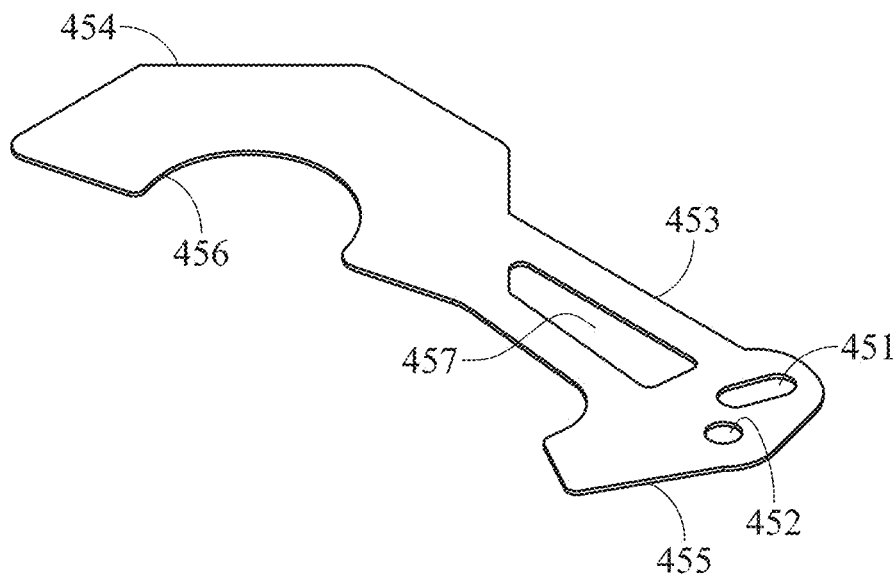
FIG. 8 is a schematic view of a first blade.

In FIG. 8, the first blade 450 includes a first recess 451 corresponding to the position of the driving portion 444, and a hole 452 corresponding to the position of the first column 411. As a result, the first column 411 may be disposed in the hole 452, and the driving portion 444 may be disposed in the first recess 451. Moreover, in some embodiments, the first blade 450 further includes a first limiting edge 453, a third limiting edge 454, a first notch edge 456, and a fourth limiting edge 455 arranged in a counterclockwise manner. The first limiting edge 453, the third limiting edge 454 and the fourth limiting edge 455 may be straight, and the first notch edge 456 may be arc-shaped and adjacent to the window formed of the through holes 412, 422 and 432 (such as adjacent to the window relative to the third limiting edge 454). In some embodiments, the first blade 450 may include a hollow portion 457 extending in a direction that is perpendicular to the optical axis 3-O, for reducing the weight of the first blade 450, so the force for driving the first blade 450 may be reduced accordingly.

Figure 9:
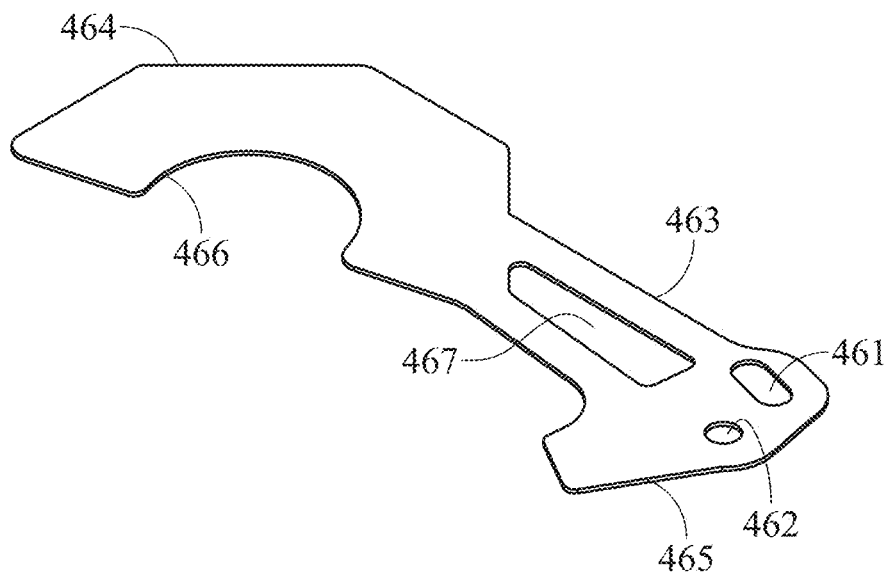
FIG. 9 is a schematic view of a second blade.

In FIG. 9, the second blade 460 includes a second recess 461 corresponding to the position of the driving portion 444, and a hole 462 corresponding to the position of the second column 413. As a result, the second column 413 may be disposed in the hole 462, and the driving portion 444 may be disposed in the second recess 461. Moreover, in some embodiments, the second blade 460 further includes a second limiting edge 463, a fifth limiting edge 464, a second notch edge 466, and a sixth limiting edge 465 arranged in a counterclockwise manner. The second limiting edge 463, the fifth limiting edge 464 and the sixth limiting edge 465 may be straight, and the second notch edge 466 may be arc-shaped and may be adjacent to the window formed of the through holes 412, 422 and 432 (such as adjacent to the window relative to the fifth limiting edge 456). In some embodiments, the second blade 460 may include a hollow portion 467 extending in a direction that is perpendicular to the optical axis 3-O to reduce the weight of the second blade 460, so the force for driving the second blade 460 may be reduced accordingly. It should be noted that the first recess 451 of the first blade 450 and the second recess 461 of the second blade 460 extend in different directions.

Figure 10:
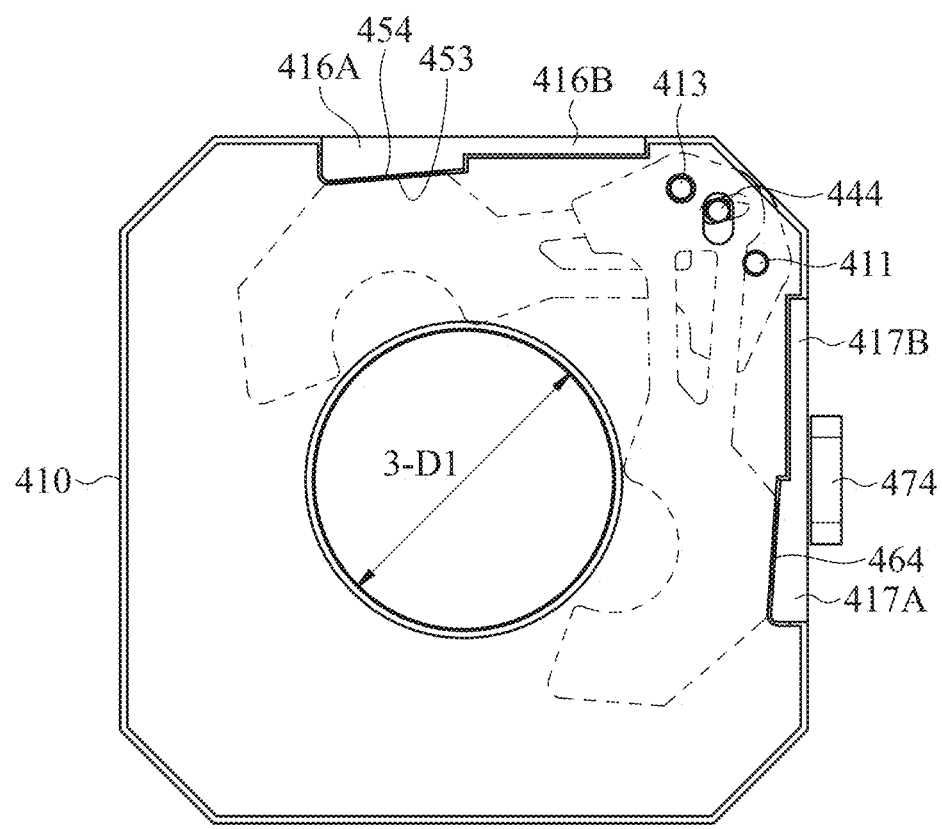
FIGS. 10 to 12 are schematic views of the light flux adjustment module when viewed in different directions.
Figure 11:
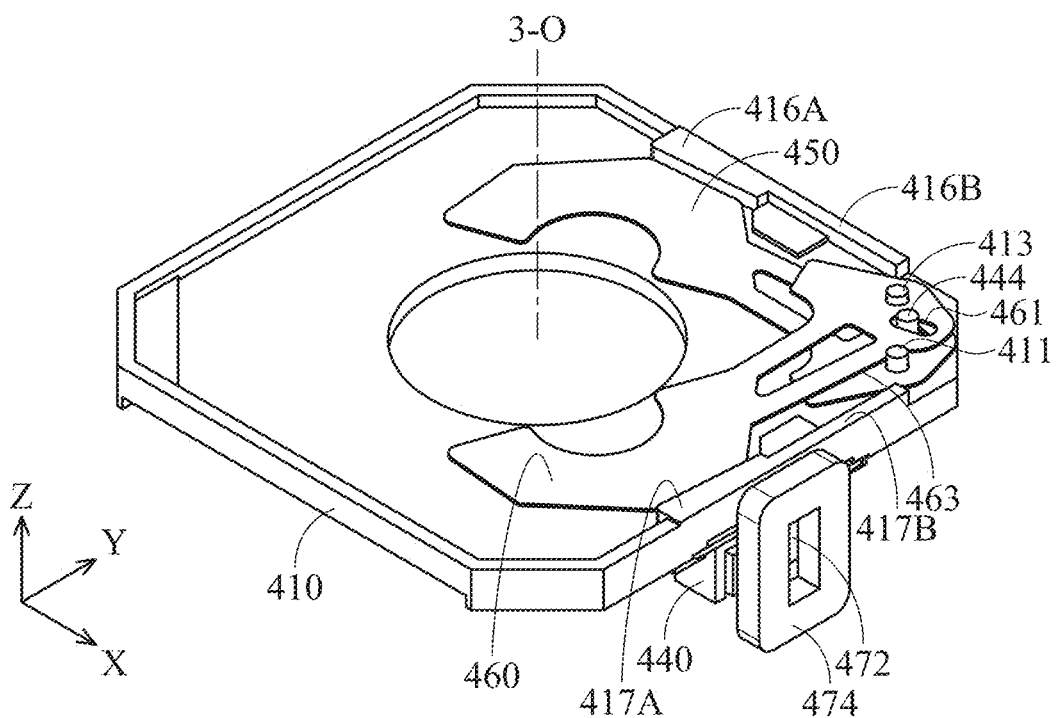
Figure 12:
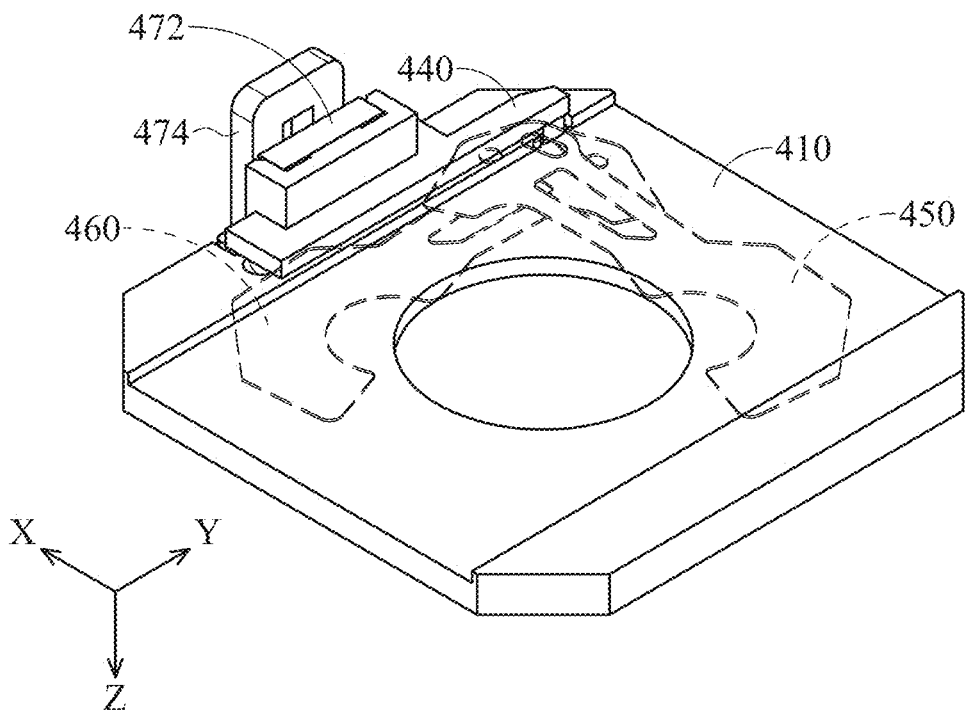

FIGS. 10 to 12 are schematic views of the light flux adjustment module 401 viewed in different directions, wherein the top plate 420 and the middle plate 430 are omitted in FIGS. 11 and 12 for clarity. Referring to FIGS. 5 to 12, the driving magnetic element 472 and the driving coil 474 of the drive assembly 470 may interact with each other to generate a magnetic force. In some embodiments, the driving magnetic element 472 may be a magnet, and may be disposed on the connecting element 440, for example. The driving coil 474 may be affixed to another element outside the light flux adjustment module 401. As a result, when the magnetic force is generated between the driving magnetic element 472 and the driving coil 474 (such as passing circuit to the driving coil 474), the driving magnetic element 472 may bring the connecting element 440 to move together via the magnetic force. For example, it may move in the Y direction.

However, the present disclosure is not limited thereto. For example, in some embodiments, the driving magnetic element 472 may be affixed to another element outside the light flux adjustment module 401, and the driving coil 474 may be affixed to the connecting element 440, so the connecting element 440 may be moved by the interaction between the driving magnetic element 472 and the driving coil 474. Furthermore, the driving magnetic element 472 may be moved in the Z direction (or along the optical axis 3-O). In some embodiments, the positioning magnetic element 476 may be disposed on the fixed portion 405 and positioned between the fixed portion 405 and the driving magnetic element 472. When the connecting element 440 is stopped, the positioning magnetic element 476 may use for attracting the driving magnetic element 472 to fix the position of the connecting element 440. In some embodiments, a portion of the connecting element 440 contacting the driving magnetic element 472 may be tilted, so the driving magnetic element 472 may be easily disposed in the connecting element 440.

In some embodiments, a wiring direction of the driving coil 474 (e.g. X direction) is perpendicular to the optical axis 3-O (e.g. Z direction). A portion of the driving coil 474 overlaps the connecting element 440, the first blade 450, and the driving magnetic element 472 in the X direction, which is perpendicular to the optical axis 3-O. In some embodiments, the positioning magnetic element 476 may partially overlap the driving magnetic element 472, and may not overlap the driving coil 474. Furthermore, in some embodiments, the positioning magnetic element 476 may not overlap the driving magnetic element 472 and may partially overlap the driving coil 474. As a result, the design may be more flexible, and the required space may be reduced by allowing the elements overlap with each other, so miniaturization may be achieved.

Referring to FIGS. 5 to 12, the driving portion 444 passes through the recesses 414 and 438 and is movably connected to the first recess 451 of the first blade 450 and the second recess 461 of the second blade 460 in FIGS. 10 to 12. The first limiting edge 453 of the first blade 450 contacts the first column 411, and the third limiting edge 454 contacts the first limiting portion 416A, so the first blade 450 is limited at a first limit position (i.e. a position of the first blade 450 that is farthest from the optical axis 3-O). The size (e.g. diameter) of the window of the light flux adjustment module 401 is 3-D1 at this time.

Furthermore, the first blade 450 may perform rotation by using the first column 411 as its rotation pivot. In other words, the first column 411 may act as a stopper and a pivot at the same time, rather than using two separated stopper and pivot, so miniaturization may be achieved.

Moreover, the second limiting edge 463 of the second blade contacts the second column 413, the fifth limiting edge 464 contacts the third limiting portion 417A, so the second blade 460 is limited at a second limit position (i.e. a position of the second blade 460 that is farthest from the optical axis 3-O). Furthermore, the second blade 460 may rotate by using the second column 413 as its rotation pivot. In other words, the second column 413 may act as a stopper and a pivot at the same time, rather than using two separated stopper and pivot, so miniaturization may be achieved.

In some embodiments, the first blade 450 and the second blade 460 may be plate-shaped and positioned on different planes. For example, the first blade 450 and the second blade 460 may be positioned on a first virtual plane and a second virtual plane (not shown), respectively. The first virtual plane and the second virtual plate may intersect rather than fully overlap with each other. As a result, the first blade 450 and the second blade 460 may move on different planes rather than collide with each other, as shown in FIGS. 11 and 12.

In some embodiments, the drive assembly 470 (which includes the driving magnetic element 472, the driving coil 474, and the positioning magnetic element 476) is disposed on a side of the case 410. Other elements may be disposed on a side of case 410 which is opposite to the drive assembly 470 to balance the weight of the light flux adjustment module 401. For example, magnetic elements or sensors may be disposed opposite to the drive assembly 470, but the present disclosure is not limited thereto. A sensor and the driving element 470 may be disposed on an identical side for detecting the movement of the driving magnetic element 472 along the optical axis 3-O.

Figure 13:
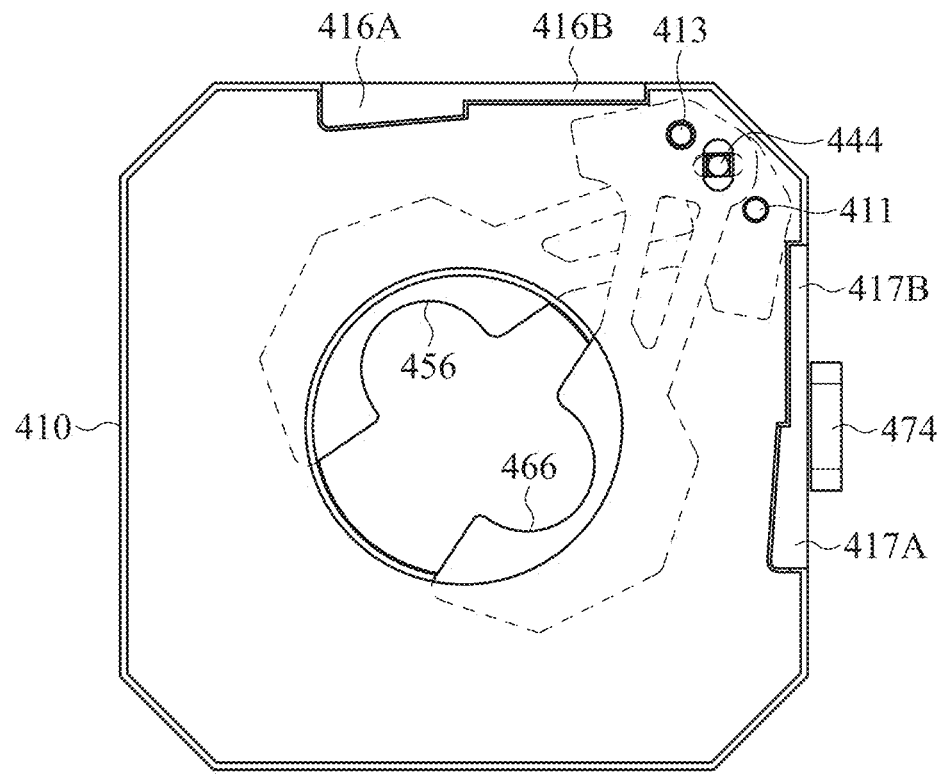
FIGS. 13 to 15 are schematic views of the light flux adjustment module when viewed in different directions.
Figure 14:
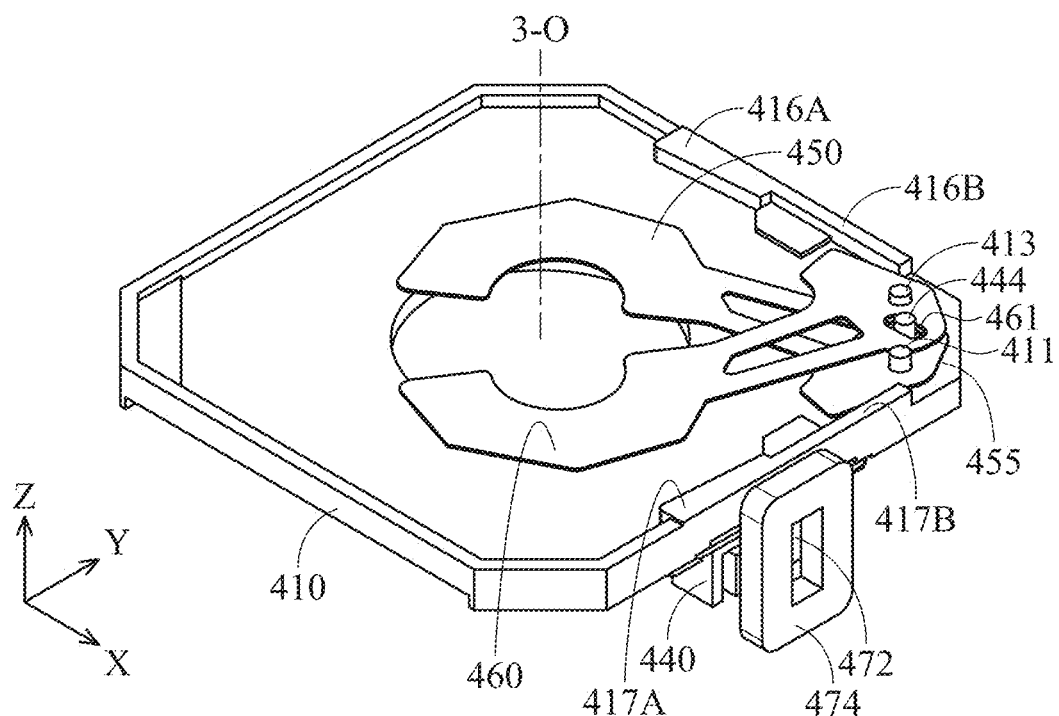
Figure 15:
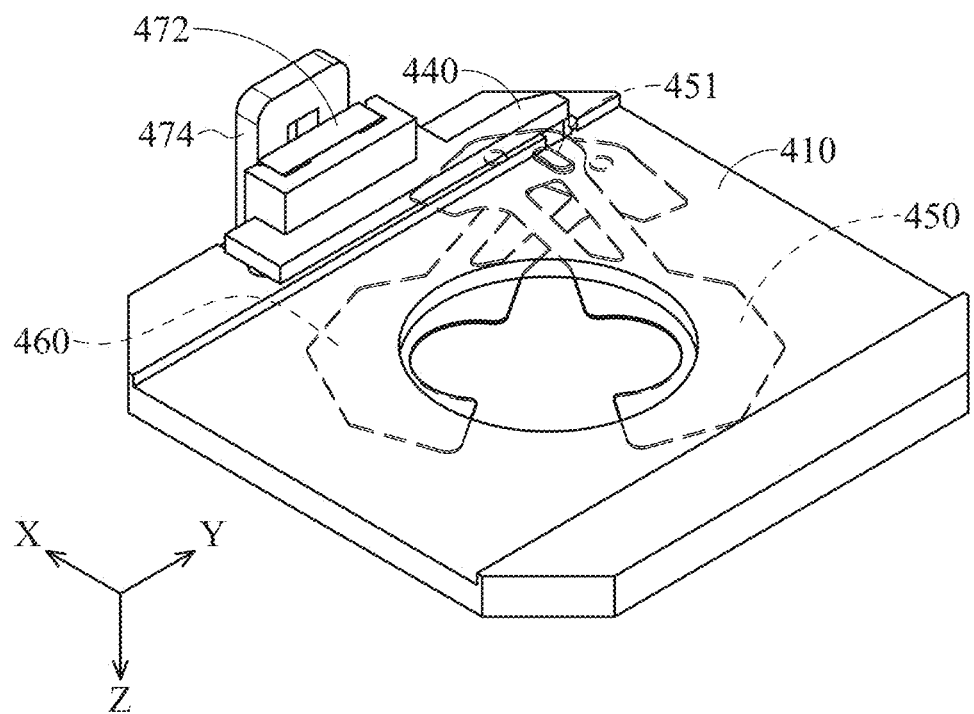

FIGS. 13 to 15 are schematic views of the light flux adjustment module 401 viewed in different directions, wherein the connecting element 440 is moved by passing current to the driving coil 474. The top plate 420 and the middle plate 430 are omitted in FIGS. 14 and 15 for clarity. When compared with the conditions in FIGS. 10 to 12, the driving portion 444 of the connecting portion 440 moves to −X direction. Because the driving portion 444 is disposed in the first recess 451 of the first blade 450 and in the second recess 461 of the second blade 460 at the same time, the first blade 450 and the second blade 460 may be driven concurrently. In particular, the first blade 450 may rotate in a clockwise manner (i.e. second moving dimension) using the first column 411 as the rotation pivot, and the second blade 460 may rotate in a counterclockwise manner (i.e. third moving dimension) using the second column 413 as the rotation pivot in FIG. 13. In other words, the first blade 450 and the second blade 460 rotate in opposite directions, and rotate or stop concurrently. By this design, two different blades (e.g. the first blade 450 and the second blade 460) may be driven by a single connecting element 440 to move in different directions, wherein the connecting element 440 only moves in a single direction. As a result, the light flux adjustment module 401 may have fewer elements to achieve miniaturization. It should be noted that the first moving dimension (i.e. linear movement in the X direction) of the connecting element 440, the second moving dimension (i.e. rotation) of the first blade 450, and the third moving dimension (i.e. rotation) of the second blade 460 are different. However, the present disclosure is not limited thereto, and the result of the present disclosure may be achieved as long as the movement manners are different. At this time, the first notch edge 456 of the first blade 450 and the second notch edge 466 of the second blade 460 come closer to each other.

Figure 16:
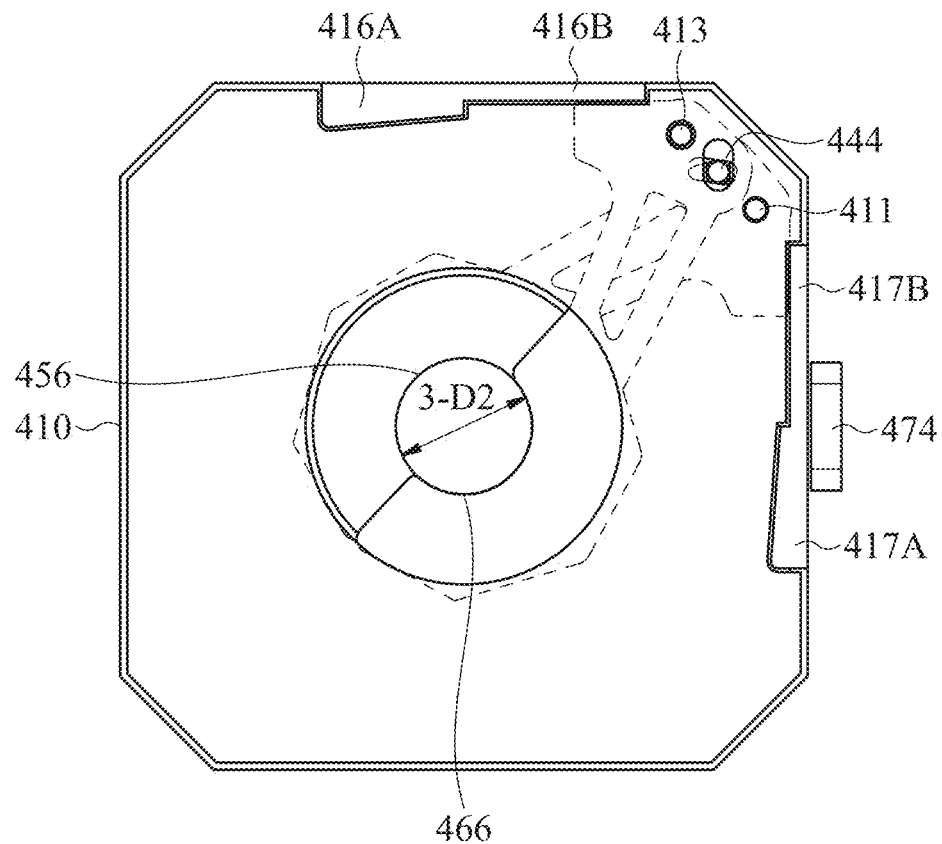
FIGS. 16 to 18 are schematic views of the light flux adjustment module when viewed in different directions, after the connecting element is further driven.
Figure 17:
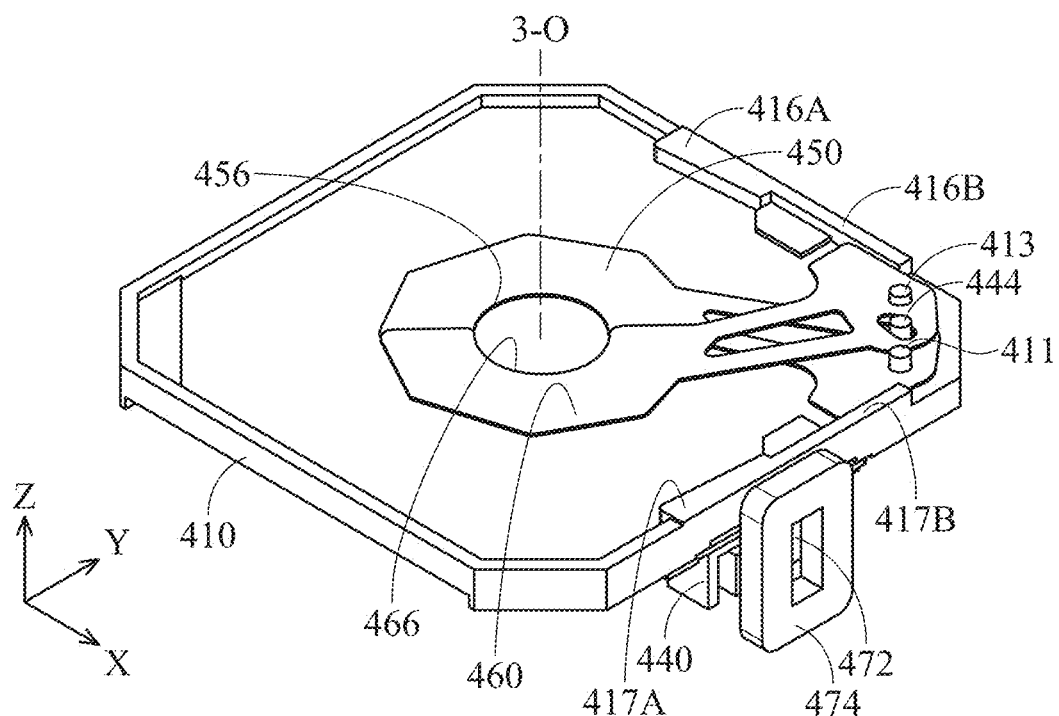
Figure 18:
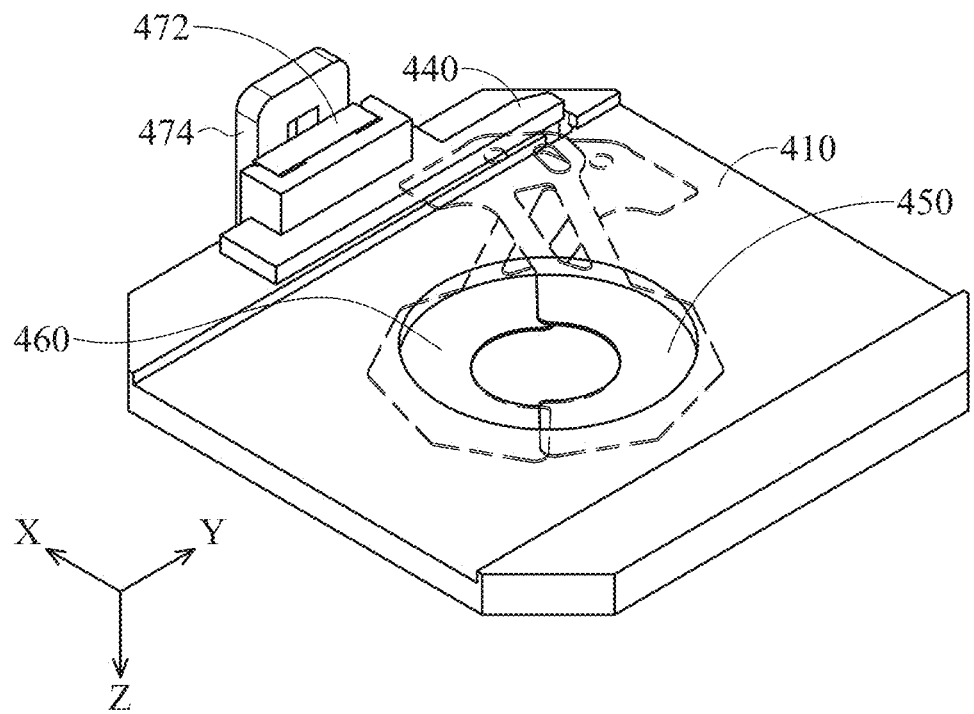

FIGS. 16 to 18 are schematic views of the light flux adjustment module 401 viewed in different directions when the connecting element 440 is further driven. The top plate 420 and the middle plate 430 are omitted in FIGS. 17 and 18 for clarity. The fourth limiting edge 455 of the first blade 450 contacts the second limiting portion 417B of the case 410, and the sixth limiting edge 465 of the second blade 460 contacts the fourth limiting portion 416B of the case 410 to restrict the first blade 450 and the second blade 460 at a third limit position and a fourth limit position, respectively, which are the positions of the first blade 450 and the second blade 460 that are most adjacent to the optical axis 3-O. In some embodiments, the range between the first limit position and the third limit position may be called as a first limit movement range, and the range between the second limit position and the fourth limit position may be called as a second limit movement range.

The first notch edge 456 of the first blade 450 and the second notch edge 466 of the second blade 460 also forms a window having a size 3-D2 (e.g. diameter) less than the size 3-D1 of the window formed of the through holes 412, 422 and 432 (FIG. 10). As a result, the size of the window of the light flux adjustment module 401 may be changed to adjust the light flux of the light having the optical axis 3-O passing through the window.

It should be noted that the hollow portion 457 of the first blade 450 overlaps the hollow portion 467 of the second blade 460 when viewed along the optical axis 3-O in FIGS. 10 to 18. Furthermore, when the first blade 450 and the second blade 460 are moving, the area of the hollow portion 457 that overlaps the hollow portion 467 and the area of the first recess 451 that overlaps the second recess 461 are changed accordingly. In other words, when the connecting element 440 moves in a movable range, the first blade 450 at least partially overlaps the second blade 460, and the first blade 450 crosses the second blade 460 (e.g. extend in different directions) when viewed along the optical axis 3-O. The fact that the first blade 450 partially crosses (or overlaps) the second blade 460 allows the first blade 450 and the second blade 460 being disposed in a relative small space, so miniaturization may be achieved.

In some embodiments, the first blade and the second blade may have no window. In other words, the window formed of the through holes 412, 422, and 432 may be totally blocked after than first blade assembling with the second blade, so the first blade and the second may act as a shutter.

Figure 19:
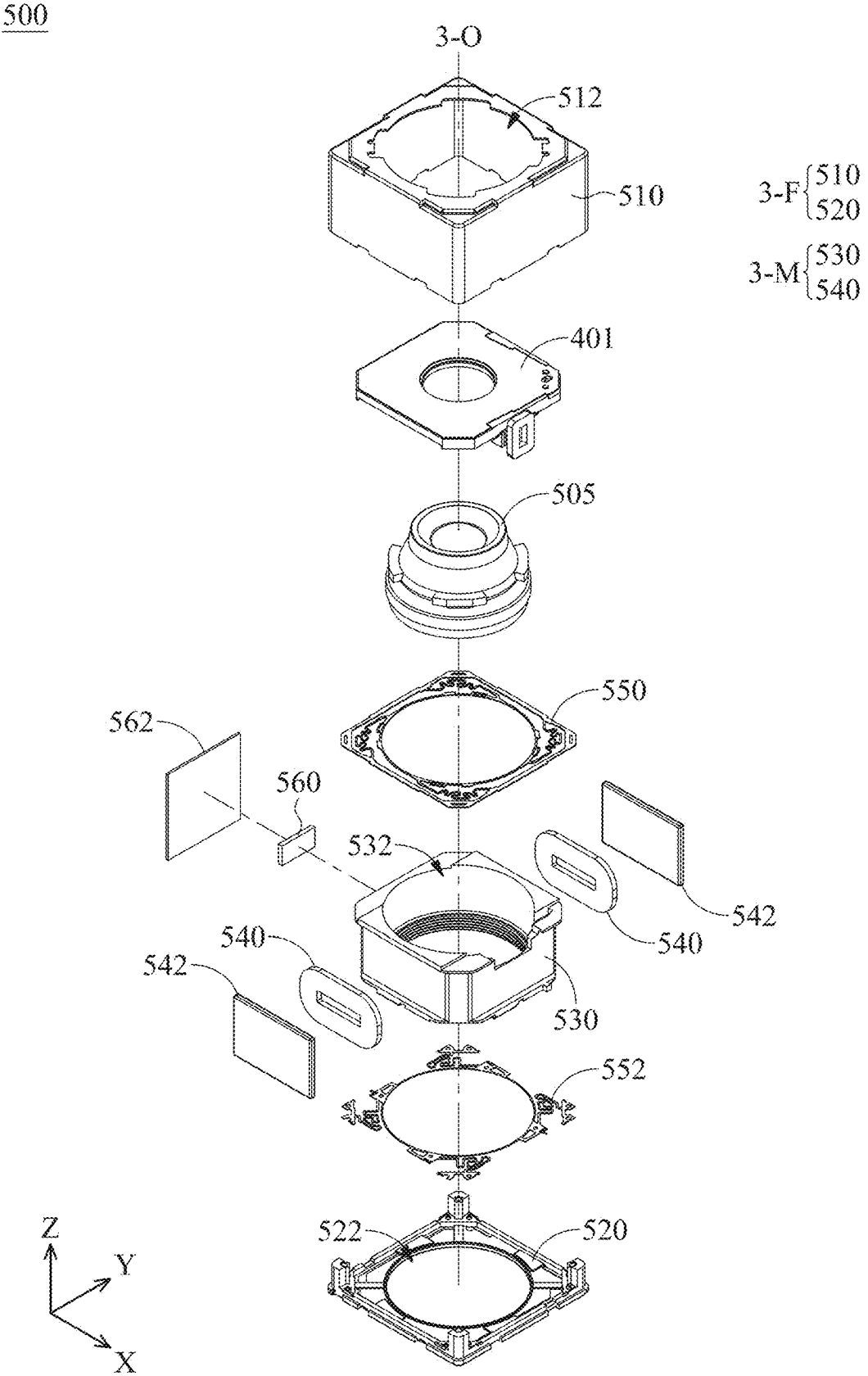
FIG. 19 is an exploded view of an optical element driving mechanism in some embodiments of the present disclosure.
Figure 20:
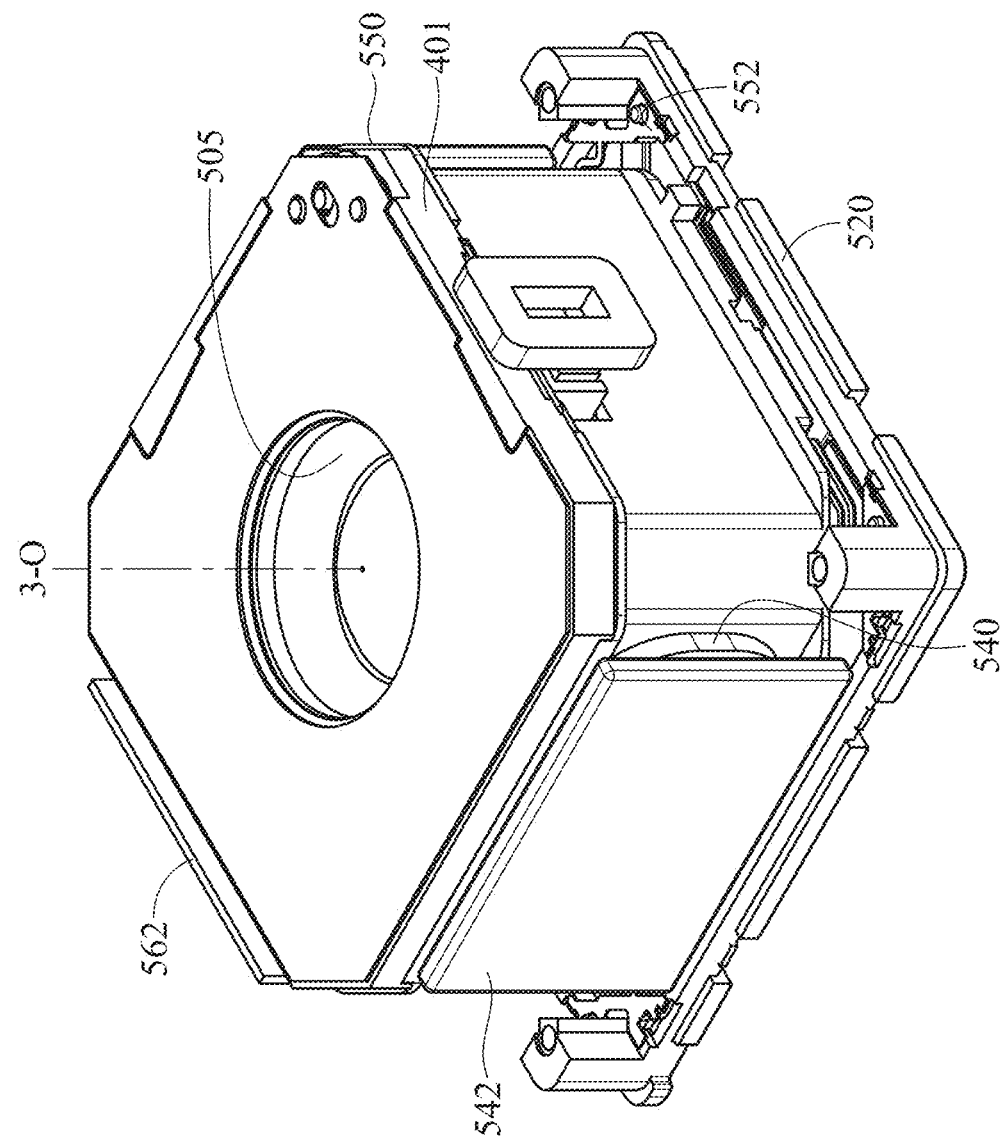
FIG. 20 is a schematic view of the optical element driving mechanism after an outer case is omitted.
Figure 21:
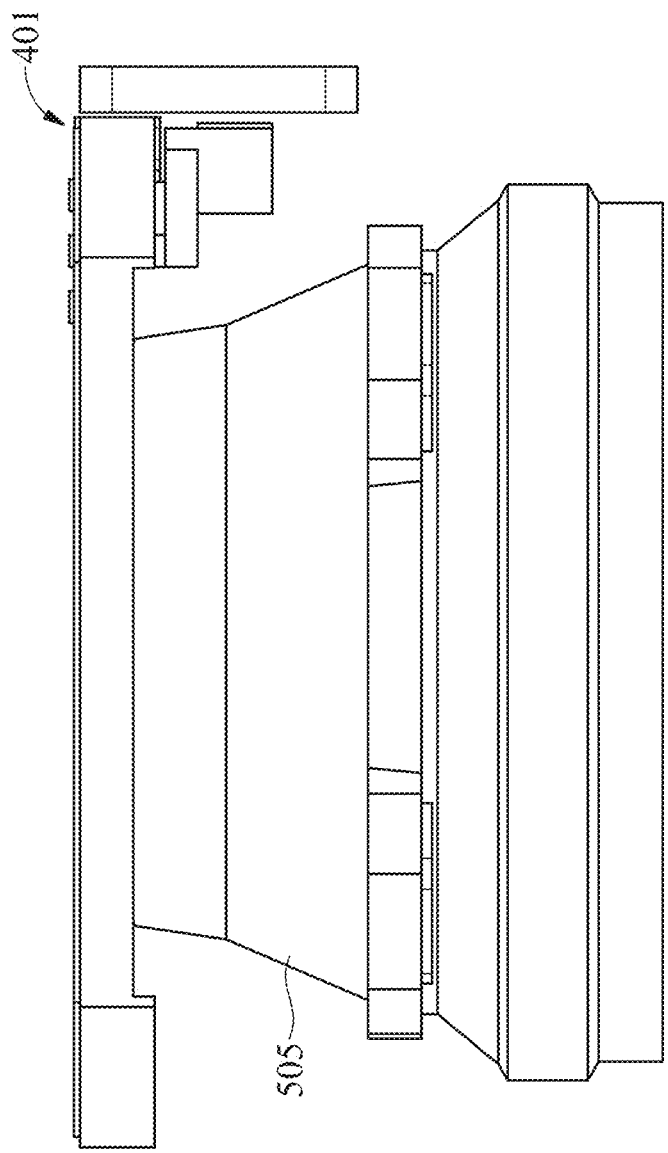
FIG. 21 is a side view of some elements of the optical element driving mechanism.

FIG. 19 is an exploded view of an optical element driving mechanism 500 in some embodiments of the present disclosure, FIG. 20 is a schematic of the optical element driving mechanism 500 when an outer case 510 is omitted, and FIG. 21 is a side view of some elements of the optical element driving mechanism 500. The optical element driving mechanism 500 may mainly include the light flux adjustment module 401, an optical element 505, an outer case 510, a bottom 520, a holder 530, a plurality of optical element driving coils 540, a plurality of driving magnetic elements 542, a resilient element 550, and a resilient element 552.

The outer case 510 and the bottom 520 may be combined with each other to form a case of the optical element driving mechanism 500, and may be called as a fixing portion 3-F. It should be noted that an outer case opening 512 and a bottom opening 522 are formed on the outer case 510 and the bottom 520, respectively. The center of the outer case opening 512 corresponds to the optical axis 3-O, the bottom opening 522 corresponds to an image sensor (not shown) outside the optical element driving mechanism 500. As a result, the optical element 505 disposed in the optical element driving mechanism 500 can perform image focusing with the image sensor along the optical axis 3-O.

The holder 530 has a through hole 532, and the optical element 505 may be fixed in the through hole 532. The optical element driving coil 540 may be disposed on the outer surface of the holder 530 and disposed in the case of the optical element driving mechanism 500, which is formed of the outer case 510 and the bottom 520, and the driving magnetic element 542 may be disposed on the outer case 510. Specifically, a magnetic force may be created by the interaction between the driving magnetic element 542 and the optical element driving coil 540 to move the holder 530 and the optical element driving coil 540 together along the direction of the optical axis 3-O to achieve rapid focusing. As a result, the holder 530 and the optical element driving coil 540 may be called as a movable portion 3-M together. In some embodiments, the driving magnetic element 542 may be disposed on the outer surface of the holder 530, and the optical element driving coil 540 may be disposed on the outer case 510 to allow the driving magnetic element 542 move with the holder 530.

In this embodiment, the holder 530 and the optical element 505 disposed therein are movably disposed in the outer case 510 and the bottom 520. More specifically, the holder 530 may be connected to and suspended in the outer case 510 and the bottom 520 by the resilient element 550 and the resilient element 552 made of a metal material, for example. When current is applied to the optical element driving coil 540, the optical element driving coil 540 can act with the magnetic field of the driving magnetic element 542 (such as a magnet) to generate an electromagnetic force to move the holder 530 and the optical element 505 along the optical axis 3-O direction relative to the outer case 510 and the bottom to achieve auto focusing.

Furthermore, the bottom 520 may be, for example, a flexible printed circuit (FPC), to be electrically connected to other electronic elements inside or outside the optical element driving mechanism 500 to achieve auto focus and optical image stabilization. Furthermore, electronic signal may be transfer through the resilient element 552 to the optical element driving coil 540 to control the movement of the holder 530 in X, Y, or Z directions.

For example, the light flux adjustment module 401 may be disposed in the case formed of the outer case 510 and the bottom 520, and may be disposed on a light incident side of the optical element 505 (a side far from the bottom 520) to control the amount of the light entering the optical element 505. In some embodiments, the light flux adjustment module 401 may be fixed to the outer case 510, and the optical element 505 may move relative to the light flux adjustment module 401. In some embodiments, the light flux adjustment module 401 may be affixed to the optical element 505 (such as on the holder 530) to move with the optical element 505 relative to the case 510. In FIG. 21, the light flux adjustment module 401 is partially disposed adjacent to the optical element 505 (i.e. overlap with the optical element 505 in X or Y direction) to effectively utilize the space of the optical element driving mechanism 500.

Figure 22:
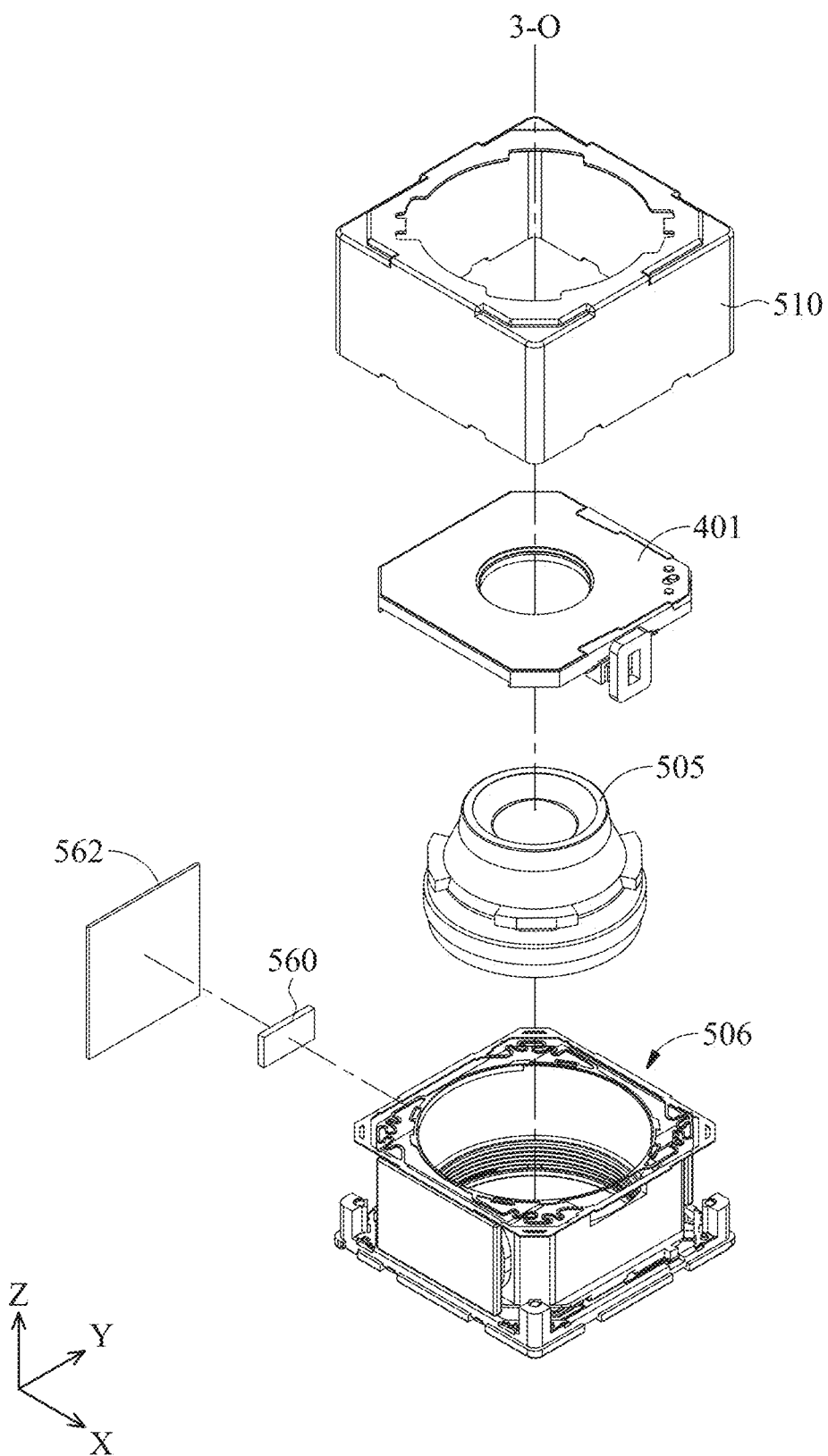
FIG. 22 is a schematic view of the optical element driving mechanism.

FIG. 22 is a schematic view when the elements of the optical element driving mechanism 500 are assembled as a driving component 506, except for light flux adjustment module 401, the optical element 505, and the outer case 510. In some embodiments, the optical element driving mechanism 500 may be assembled in a subsequence of positioning the optical element 505 in the driving component 506, positioning the light flux adjustment module 401 on the driving component 506, and positioning the outer case 510 on the driving component 506. However, the present disclosure is not limited thereto. For example, the optical element driving mechanism 500 may be assembled in a subsequence of assembling the light flux adjustment module 401 with the driving component 506, providing the optical element 505 in the driving component 506 from another side of the driving component 506 (the side without the light flux adjustment module 401), and the providing the outer case 510 on the driving component 506. In this way, the required number of elements during assembling may be reduced, so the height of the optical element driving mechanism 500 may be reduced to achieve miniaturization. In some embodiments, the light flux adjustment module 401 may be disposed between the bottom 520 and the resilient element 550.

Figure 23:
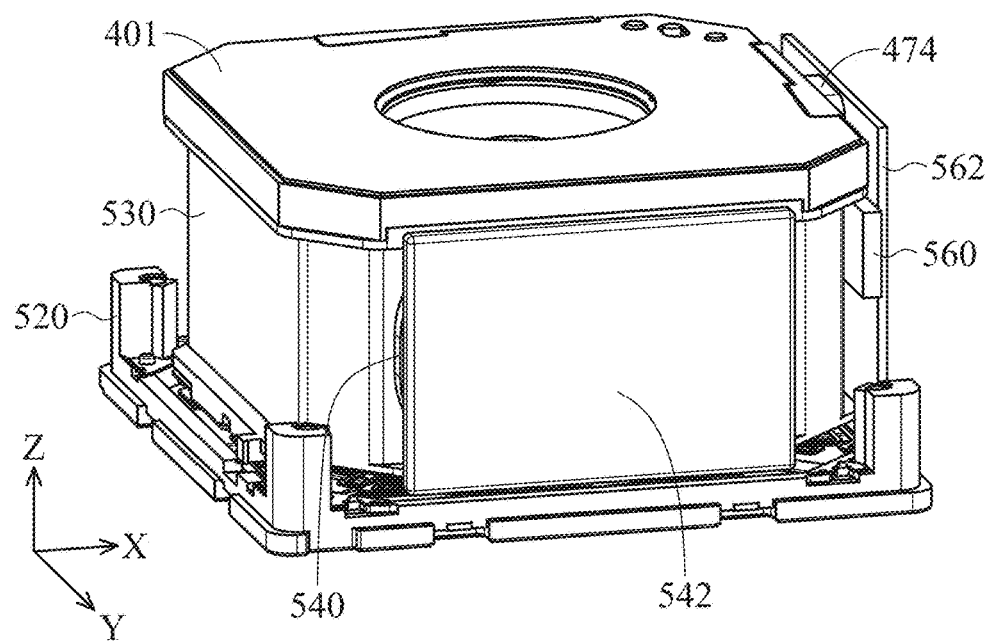
FIG. 23 is a schematic view of an optical element driving mechanism in some embodiments of the present disclosure.
Figure 24:
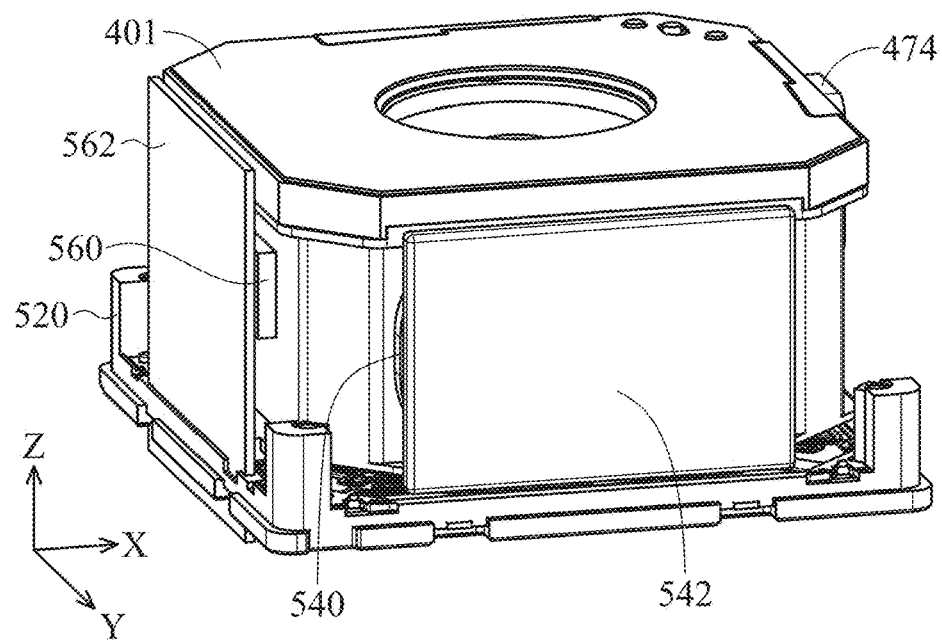
FIG. 24 is a schematic view of an optical element driving mechanism in some embodiments of the present disclosure.

FIGS. 23 and 24 are schematic views of an optical element driving mechanism 501 and an optical element driving mechanism 502 in some embodiments of the present disclosure, respectively. The optical element driving mechanisms 501 and 502 further include a sensor 560 and a circuit element 562. In FIG. 23, the sensor 560 and the circuit element 562 of the optical element driving mechanism 501 and the drive assembly 470 (such as the driving coil 474) of the light flux adjustment module 401 may be disposed on an identical side. As a result, the space at the side of the optical element driving mechanism 501 may be further utilized to achieve miniaturization. In FIG. 24, the sensor 560 and the circuit element 562 of the optical element driving mechanism 502 may be disposed on a different side to the drive assembly 470 (such as the driving coil 474) of the light flux adjustment module 401, such as disposed on opposite sides. As a result, magnetic interference that possibly occurs may be prevented. In some embodiments, a plurality of sensors 560 may be disposed on an identical side of the optical element driving mechanism 500 to separately detect the movement between the fixing portion 3-F and the movable portion 3-M, and the movement between the fixed portion 405 and the connecting portion 440. All of the plurality of the sensors 560 may be partially disposed on the circuit element 562.

In some embodiments, the light flux adjustment module 401 may be operated after the adjustment of the focal length of the optical element 505 is finished, and the position of the driving magnetic element 472 is fixed. As a result, the focal length of the optical element 505 may be adjusted when the intensity of light incident to the optical element 505 is relatively high, so the accuracy of the adjustment may be enhanced. Therefore, before the light flux adjustment module 401 is shut down, a signal may be sent to the light flux adjustment module 401 for turning on the light flux adjustment module 401 (i.e. make the window not covered by the first blade 450 and the second blade 460).

Figure 25:
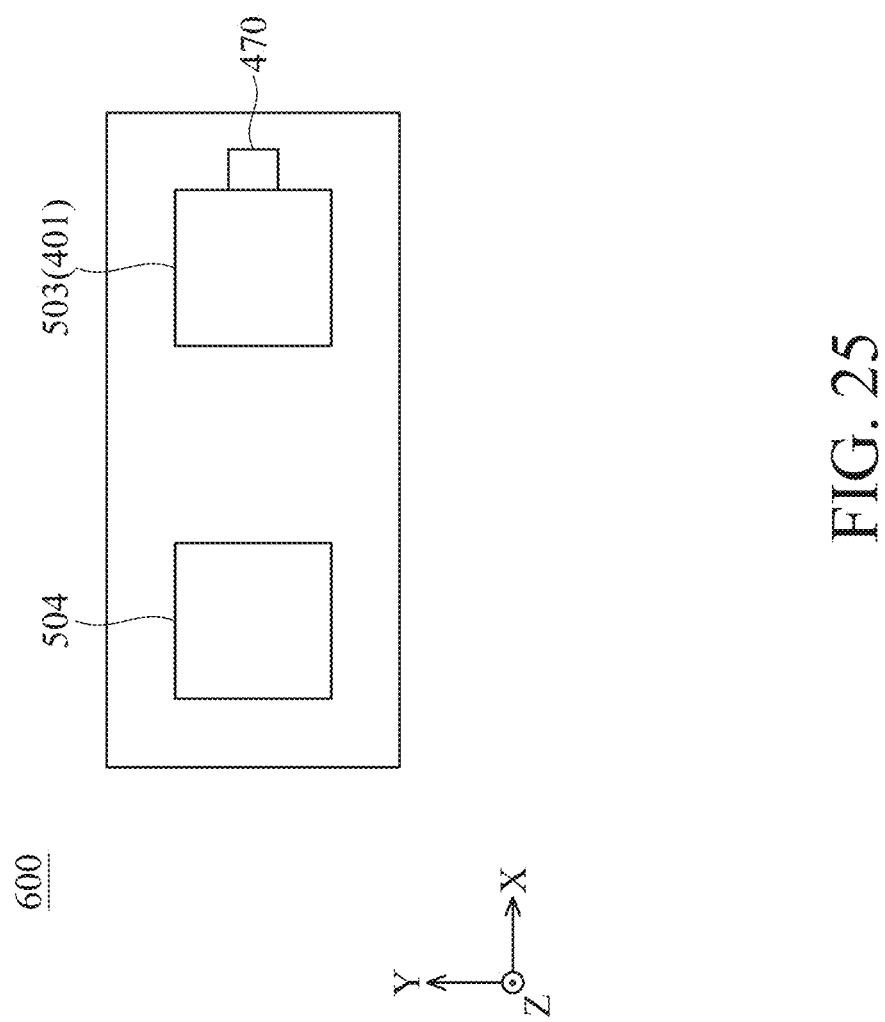
FIG. 25 is a schematic view of an optical system in some embodiments of the present disclosure.

The light flux adjustment module 401 provided in the present disclosure also may be applied in an optical system having two lenses. For example, the optical system 600 in FIG. 25 includes an optical element driving mechanism 503 and an optical element driving mechanism 504, wherein the light flux adjustment module 401 is disposed on the optical element driving mechanism 503, and does not disposed on the optical element driving mechanism 504. The optical element driving mechanisms 503 and 504 may be mechanisms with different functions, such as being mechanisms having a wide angle lens and a long focal length lens, respectively. In this embodiment, the drive assembly 470 of the light flux adjustment module 401 may be disposed on a side far from the optical element driving mechanism 504 to prevent possible magnetic interference. In some embodiments, the light flux adjustment module 401 may be provided on the optical element driving mechanism 504, and the drive assembly 470 of the optical element driving mechanism may be disposed on a side far from the optical element driving mechanism 503, too.

Figure 26:
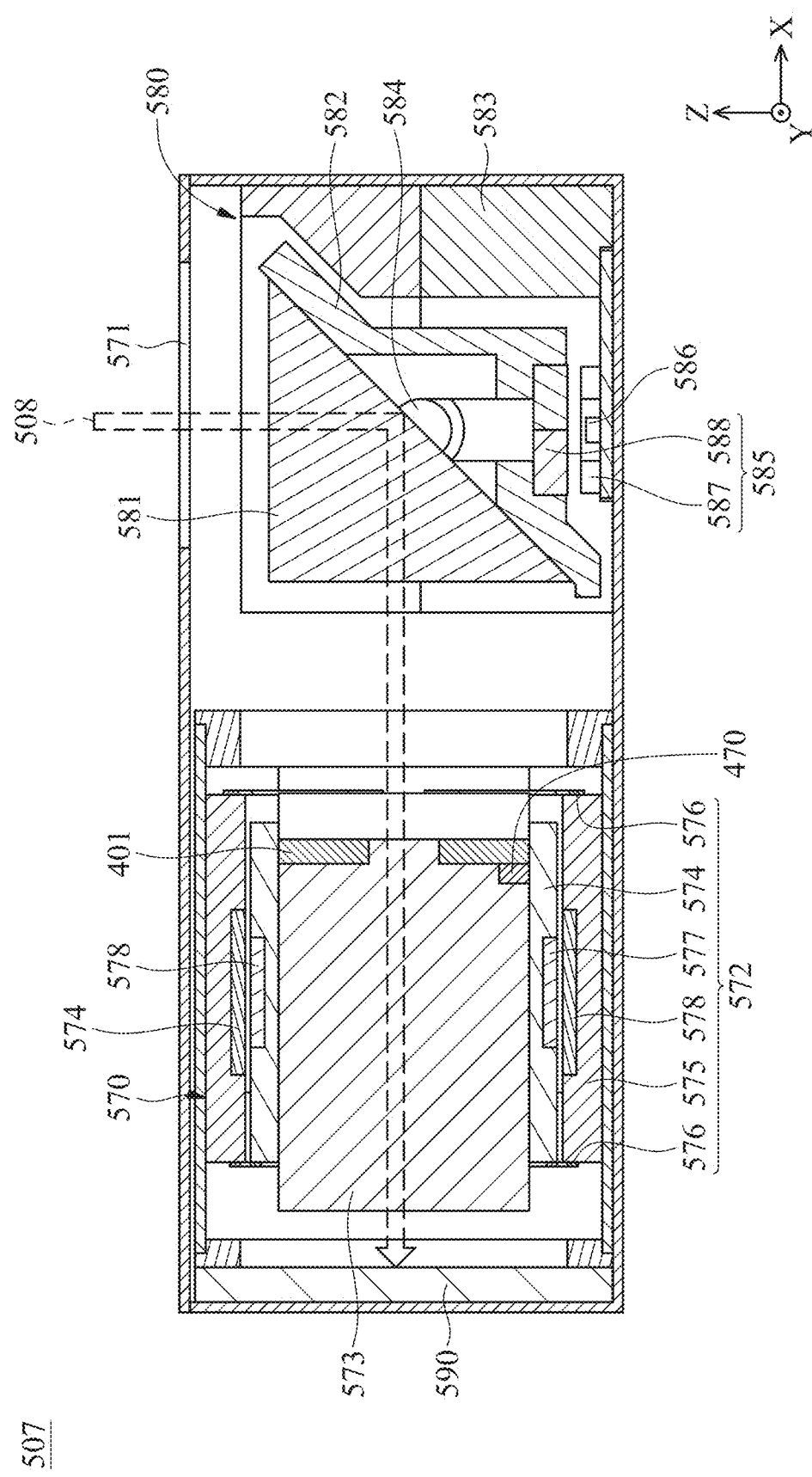
FIG. 26 is a schematic view of an optical system in some embodiments of the present disclosure.

In some embodiments, the light flux adjustment module 401 may be applied in a periscope optical system. For example, as shown in FIG. 26, a periscope optical system 507 may include an optical element driving module 570, an optical path adjustment module 580, and an optical sensor 590. External light (such as light 508) which enters the optical element 507 through a light incident hole 571 may be reflected by the optical path adjustment module 580 to pass through the optical element driving mechanism 570, and the be received by the image sensor 590. In other words, the direction of the light 508 may be changed by the optical path adjustment module 580.

The detailed structures of the optical element driving module 570 and the light path adjustment module 580 are described below. As shown in FIG. 26, the optical element driving module 570 mainly includes a driving mechanism 572 and a camera module 573, wherein the driving mechanism 572 is used for moving the camera module 573 relative to the image sensor 590. For example, the driving mechanism 572 may include a camera module holder 574, a frame 575, two spring sheets 576, at least one coil 577, and at least one magnetic element 578.

The camera module 573 is affixed to the cameral module holder 574. Two spring sheets 576 are connected to the cameral module holder 574 and the frame 575, and respectively disposed on opposite sides of the cameral module holder 574. Thus, the camera module holder 574 can be movably hung in the frame 575. The coil 577 and the magnetic element 578 are respectively disposed on the cameral module holder 574 and the frame 575, and correspond to each other. When current flows through the coil 577, an electromagnetic effect is generated between the coil 577 and the magnetic element 578, and the cameral module holder 574 and the camera module 573 disposed thereon can be driven to move relative to the image sensor 590.

The optical path adjustment module 580 mainly includes an optical element 581, an optical element holder 582, a frame 583, at least one hinge 584, a driving module 585, and a position sensor 586. The driving module 585 can include a first electromagnetic drive assembly 587 and a second electromagnetic drive assembly 588, respectively disposed on the frame 583 and the optical element holder 582 and corresponding to each other.

The optical element holder 582 may be affixed to the hinge 584, and the hinge 584 is rotatable and disposed on the frame 583 (such as rotate through a bearing, not shown). Therefore, the optical element holder 582 can be pivotally connected to the frame 583 via the hinge 584. Since the optical element 581 is disposed on the optical element holder 582, when the optical element holder 582 rotates relative to the frame 583, the optical element 581 disposed thereon also rotates relative to the frame 583. The optical element 581 can be a prism or a reflecting mirror.

For example, the first electromagnetic drive assembly 587 may include a driving coil, and the second electromagnetic drive assembly 588 may include a magnet. When a current flows through the driving coil (the first electromagnetic drive assembly 587), an electromagnetic effect is generated between the driving coil and the magnet. Thus, the optical element holder 582 and the optical element 581 can be driven to rotate relative to the frame 583, so as to adjust the position of the external light 508 on the image sensor 590. With structured light, infrared ray or ultrasonic waves, this disclosure may achieve the effects of depth sensing, spatial scanning, etc. Additionally, this disclosure may be applied to spatial planning, compensating for the impact of the environment, improving the blurring of images or videos when the light is bad or weather is poor, and enhancing the quality of shooting or recording.

The position detector 586 can be disposed on the frame 583 and correspond to the second electromagnetic drive assembly 588, so as to detect the position of the second electromagnetic drive assembly 588 to obtain the rotation angle of the optical element 581. For example, the position detectors 586 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the light flux adjustment module 401 may be disposed between the camera module 573 and the optical element 581 and arranged with each other in the X direction for controlling the amount of light passing through the camera module 573, as shown in FIG. 26. When viewed in the Y direction, the optical element driving mechanism 570 at least partially overlaps the light flux adjustment module 401. For example, the optical element driving mechanism 570 at least partially overlaps the drive assembly 470. Moreover, the camera module 573 at least partially overlaps the light flux adjustment module 401 (such as partially overlaps the drive assembly 470). Moreover, the camera module 573 may be partially disposed in the light flux adjustment module 401 (such as partially disposed in the window formed of the through holes 412, 422 and 432). As a result, required space may be reduced to achieve miniaturization.

In summary, a light flux adjustment module is provided for adjusting light flux of light having an optical axis, including a fixed portion, a connecting element, a first blade, and a drive assembly. The fixed portion includes a window, and the light passes through the window. The connecting element is movably connected to the fixed portion. The first blade is movably connected to the connecting element and the fixed portion, and the first blade is adjacent to the window. The drive assembly is used for driving the connecting element to move relative to the fixed portion in a first moving dimension. When the connecting element is moved relative to the fixed portion in the first direction, the first blade is driven by the connecting element to move relative to the fixed portion in a second moving dimension, and the first moving dimension and the second moving dimension are different. Moreover, optical element driving mechanisms and optical systems using the light flux adjustment module are provided in the present disclosure as well. The light flux adjustment module may adjust the amount of light passed through, enhance the image quality, and achieve miniaturization.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
a movable portion used for connecting to an optical element having an optical axis, comprising:
a bottom having a window corresponding to the optical axis;
a first blade corresponding to the window, and is movable relative to the bottom;
a connecting element movable relative to the bottom and is used for bringing the first blade to move;
a first driving assembly used for driving the connecting element to move relative to the bottom;

a fixed portion, wherein the movable portion is movable relative to the fixed portion;

a second driving assembly used for driving the movable portion to move relative to the fixed portion, wherein the fixed portion has a polygonal structure when viewed along the optical axis; and a first resilient element and a second resilient element disposed on an identical side of the bottom.

2. The optical system as claimed in claim 1, wherein the first driving assembly and the second driving assembly are disposed on different sides of the movable portion.

3. The optical system as claimed in claim 1, wherein the first driving assembly does not overlap the second driving assembly when viewed along the optical axis.

4. The optical system as claimed in claim 1, wherein the movable portion further comprises a second blade, the first blade has a first notch edge, a first edge connecting to the first notch edge, a second edge connecting to the first notch edge, when viewed along the optical axis, at least a portion of the first edge of the first blade and at least a portion of the second edge of the first blade overlap the second blade.

5. The optical system as claimed in claim 1, wherein the movable portion further comprises a second blade, a first hollow portion is formed in the first blade, a second hollow portion is formed in the second blade, and at least a portion of the first hollow portion overlaps the second hollow portion when viewed along the optical axis.

6. The optical system as claimed in claim 5, further comprising a middle plate disposed between the first blade and the second blade.

7. The optical system as claimed in claim 6, wherein a thickness of the bottom is greater than a thickness of the middle plate.

8. The optical system as claimed in claim 6, wherein a portion of the connecting element is exposed from the middle plate when viewed along the optical axis.

9. The optical system as claimed in claim 1, wherein the connecting element has a concave portion, and the first driving assembly comprises:

a first driving magnetic element disposed in the concave portion; and a first driving coil disposed outside the concave portion.

10. The optical system as claimed in claim 9, wherein the movable portion further comprises a holder, and the first driving coil does not overlap the holder when viewed along the optical axis.

11. The optical system as claimed in claim 10, further comprises a circuit element, wherein the circuit element and the first driving coil are disposed on opposite sides of the holder.

12. The optical system as claimed in claim 10, wherein the fixed portion comprises a case, and the case is in contact with the holder.

13. The optical system as claimed in claim 1, wherein the fixed portion comprises a case, and the movable portion further comprises balls disposed between the connecting element and the case.

14. The optical system as claimed in claim 13, wherein the first driving assembly comprises a first driving magnetic element, and the first driving magnetic element and the balls are disposed on opposite sides of the connecting element and in contact with the connecting element.

15. The optical system as claimed in claim 1, wherein the first driving assembly comprises:

a driving magnetic element;

a driving coil; and a positioning magnetic element, wherein the positioning magnetic element partially overlaps the driving magnetic element and does not overlap the driving coil when viewed along the optical axis.

16. An optical system, comprising:

a movable portion used for connecting to an optical element having an optical axis, comprising:

a bottom having a window corresponding to the optical axis;

a first blade corresponding to the window, and is movable relative to the bottom;

a connecting element movable relative to the bottom and is used for bringing the first blade to move;

a first driving assembly used for driving the connecting element to move relative to the bottom;

a fixed portion comprising a case, wherein the movable portion is movable relative to the fixed portion; and a second driving assembly used for driving the movable portion to move relative to the fixed portion, wherein the fixed portion has a polygonal structure when viewed along the optical axis, wherein the case comprises a first limiting portion and a second limiting portion disposed on different sides of the case, the movable portion further comprises a top plate, and the first limiting portion and the second limiting portion are exposed from the top plate when viewed along the optical axis.

17. The optical system as claimed in claim 16, wherein the top plate and the connecting element are disposed on opposite sides of the case.

18. The optical system as claimed in claim 16, wherein the case further comprises a protruding portion connects to the first limiting portion, wherein a thickness of the protruding portion is greater than a thickness of the first blade.

19. The optical system as claimed in claim 18, wherein a thickness of the first limiting portion is greater than the thickness of the protruding portion.

* * * * *